United States Patent [19]

Byram et al.

[11] 3,757,311

[45] Sept. 4, 1973

[54] SYSTEM FOR OUTPUTTING LINES ABOUT A POINT OF OPERATION

[75] Inventors: James C. Byram; James W. Toups, both of Austin, Tex.

[73] Assignee: International Business Machines Corporation, Armonk, N.Y.

[22] Filed: Mar. 30, 1972

[21] Appl. No.: 239,482

[52] U.S. Cl. .......... 340/172.5, 340/324 A
[51] Int. Cl. .......... G06f 3/14
[58] Field of Search .......... 340/172.5, 324 A

[56] References Cited

UNITED STATES PATENTS

| | | | |
|---|---|---|---|
| 3,579,196 | 5/1971 | Gregg | 340/172.5 |
| 3,501,746 | 3/1970 | Vosbury | 340/172.5 |
| 3,346,853 | 10/1967 | Koster | 340/172.5 |
| 3,581,290 | 5/1971 | Sugarman | 340/172.5 |
| 3,623,005 | 11/1971 | Roberts | 340/172.5 |
| 3,631,455 | 12/1971 | Gregg | 340/324 A |
| 3,648,245 | 3/1972 | Dodds | 340/112.5 |
| 3,685,019 | 8/1972 | Conroy | 340/172.5 |

*Primary Examiner*—Paul J. Henon
*Assistant Examiner*—Sydney R. Chirlin
*Attorney*—James H. Barksdale, Jr. et al.

[57] ABSTRACT

A system for obtaining a number of lines about an operating point for output purposes such as display. The system is comprised of an input/output (I/O) typewriter, an electronic dynamic shift register (DSR), an intermediate electronic dynamic shift register (IDSR), and a display controlled by format control logic and a frame buffer. The IDSR control logic controls codes input into the IDSR from the DSR data and control code memory. One of the control codes in the DSR data flow is an operation flag which defines the point of operation in the DSR. In order to obtain a number of lines surrounding the operation flag for output purposes, an IDSR of limited character capacity is used. The data and control codes making up the data flow in the DSR are transferred to the IDSR until sufficient text surrounding the operation flag is contained in the IDSR. Prior to output, excess data and control codes are removed from the IDSR data flow until only the data to be output remains in the IDSR. For example, if five lines are to be displayed with the operation flag positioned in the middle line, data is loaded into the IDSR until at least those five lines are obtained. Then the excess data and control codes are removed from the IDSR data flow. When exactly the data to be output remains, it is transferred to a display device.

11 Claims, 10 Drawing Figures

SYSTEM FOR OUTPUTTING LINES ABOUT A POINT OF OPERATION

CROSS-REFERENCES TO RELATED APPLICATIONS

U.S. Pat. No. 3,675,216, Ser. No. 104,888, filed Jan. 8, 1971, issued July 4, 1972, entitled "No Clock Shift Register and Control Technique", having R. L. James as inventor.

U. S. patent application Ser. No. 158,346, filed June 30, 1971, entitled "Machine Log System", having F. T. May as inventor.

U. S. patent application Ser. No. 158,347, filed June 30, 1971, entitled "Data Flow in a Machine Log System", having R. D. Lindsey et al. as inventors.

U. S. patent application Ser. No. 194,418, filed Nov. 1, 1971, entitled "System for Merging Data Flow", having R. G. Bluethman et al. as inventors.

U. S. patent application Ser. No. 214,370, filed Dec. 30, 1971, entitled "System for Arranging and Sharing Shift Register Memory" having R. D. Lindsey et al. as inventors.

U. S. patent application Ser. No. 214,369, filed Dec. 30, 1971, entitled "System for Performing Multiple Operations", having R. G. Bluethman as inventor.

U. S. patent application Ser. No. 222,513, filed Feb. 1, 1972, entitled "System for Revision Line Retrieval", having J. C. Greek et al. as inventors.

U. S. patent application Ser. No. 219,798. filed Jan. 21, 1972, entitled "Text Formating for Display", having W. W. Boyd as inventor.

U. S. patent application Ser. No. 229,998, filed Feb. 29, 1972, entitled "System for Obtaining Correspondence Between Memory and Output", having R. G. Bluethman et al. as inventors.

BACKGROUND OF THE INVENTION

1. Field of the Invention - This invention relates generally to obtaining and arranging data for output purposes, and more specifically to a system for obtaining text about an operating point for display purposes.

2. Description of the Prior Art

Heretofore, obtaining data for purposes of display has been accomplished in a number of ways using intermediate and limited capacity buffers. For example, representative of the closest known prior art is IBM TDB, Vol. 14, No. 10, dated March, 1972. In this publication synchronization is a primary object. With the present invention, the area of synchronization and actual control of output is of no concern other than the fact that data is prepared for output. Only that data which is to be handled by output or display devices is to be obtained and the actual display or output thereof can be handled in known manners.

SUMMARY OF THE INVENTION

Through the use of a system having an I/O typewriter, a DSR, an IDSR, and a display device, a number of lines about a point of operation in the DSR can be obtained and displayed for checking and revision purposes. That is, instead of going through a time consuming printout, the lines in the vicinity of the operating point can be immediately displayed. Upon viewing the displayed material, it can be checked for any necessary revision to be accomplished in the DSR. The DSR is initially loaded with data codes, and control codes such as dummy codes, carrier return (CR) codes, record, operation, hold, and separator flags, making up and defining lines of text, operating points, and sections. Thereafter, the loading of the IDSR can begin at any point in the DSR memory. A mark code is first input into the IDSR data flow and followed by the codes from the DSR. The mark code is used to differentiate old and new codes in the IDSR. During the loading of the IDSR, a total line end counter and a pre-flag line end counter are incremented as line ends are detected going into (at the input of) the IDSR. The pre-flag line end counter can only be incremented up to three which is the necessary number of lines to be obtained prior to the operation flag. The total line end count is the total count of line ends up to the detection of the operation flag. If the pre-flag line end counter fails to be incremented to three before the operation flag is detected, then insufficient text has been acquired prior to the operation flag for display purposes. Also, if the pre-flag line end codes gated into the IDSR were preceded by a dummy or separator code, then the operation flag was within three lines of the beginning of the page. In this case, line end codes are later written into the IDSR to bring the pre-flag line end count up to three. Upon detecting the operation flag, both the pre-flag line end counter and the total line end counter are no longer incremented.

After the operation flag has been detected, loading of the IDSR continues until a post flag line end counter either reaches three, or a dummy or separator code is detected indicating that the operation flag was near the end of the page. In either event, loading of the IDSR is terminated since sufficient text has been loaded into the IDSR for purposes of display. At this time, any line end deficiencies (pre- and/or post) are made up by writing line end codes into the IDSR.

Once the mark code has made one revolution in the IDSR, it is held and all codes detected at the output of the IDSR are new. The line end codes which are detected thereafter at the IDSR output are used to decrement the total line end counter. Therefore, the total line end count will be equal to the number of line ends in the IDSR preceding the operation flag.

The loading of the IDSR terminates with the detection of a dummy or separator code or when the post flag line end count reaches three as pointed out above. Also, prior to the operation flag there may have been a number of pre-flag line endings in excess of three which must be removed. This is accomplished by writing over codes in the IDSR with delete codes while continuing to decrement the total line end counter until it is equal to the preflag line end count. At this time, the text remaining in the IDSR is exactly the text to be displayed.

DESCRIPTION OF THE PREFERRED EMBODIMENT

Figure 1:
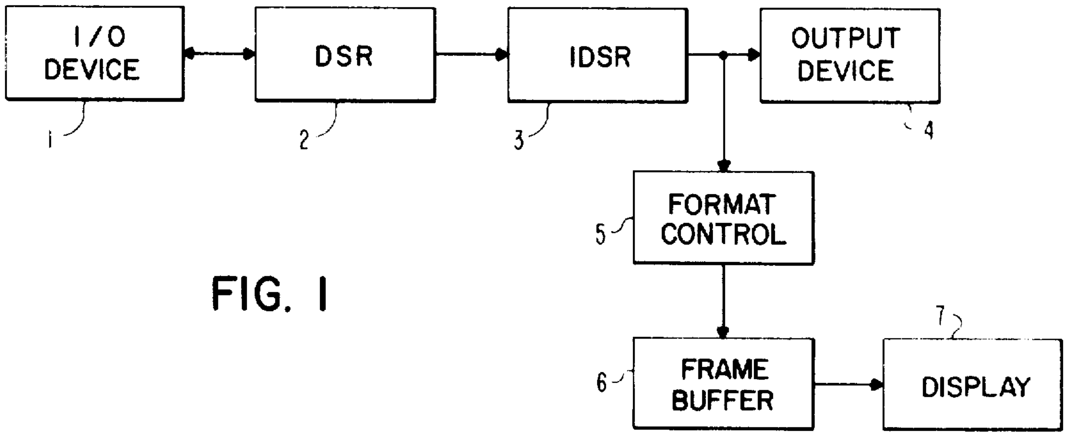
FIG. 1 is an overall block diagram illustrating a system having a DSR associated with an I/O device and an IDSR which in turn is associated with an output device.

For a more detailed description of the invention, reference is first made to FIG. 1 wherein there is shown an input/output device 1 in two way communication with an electronic dynamic shift register (DSR) 2. The DSR communicates with an intermediate electronic dynamic shift register (IDSR) 3 which in turn communicates with either output device 4 or format control 5, frame buffer 6 and display 7. Both devices 1 and 4 can be bulk stores and/or reader recorders. Bulk store and reader recorder are meant to include recording media such as tapes, cards, discs, etc., and the associated structure for reading, writing, and erasing data and control codes onto and from the recording media. Control codes as used herein include carrier return codes, dummy codes, delete codes, and record, operation, separator, and hold flags.

Broadly, reference to an input operation is to be taken as a write-over operation where, for example, delete codes are written over data codes. Insert operations include the insertion of data and control codes into the data flow, and delete operations include writing over data and/or control codes with delete codes. For insert operations the data flow is essentially expanded for inclusion of a data or control code. Output operations include, for example, the reading of data codes in the intermediate shift register and the output of these data codes to a display.

Figure 2:
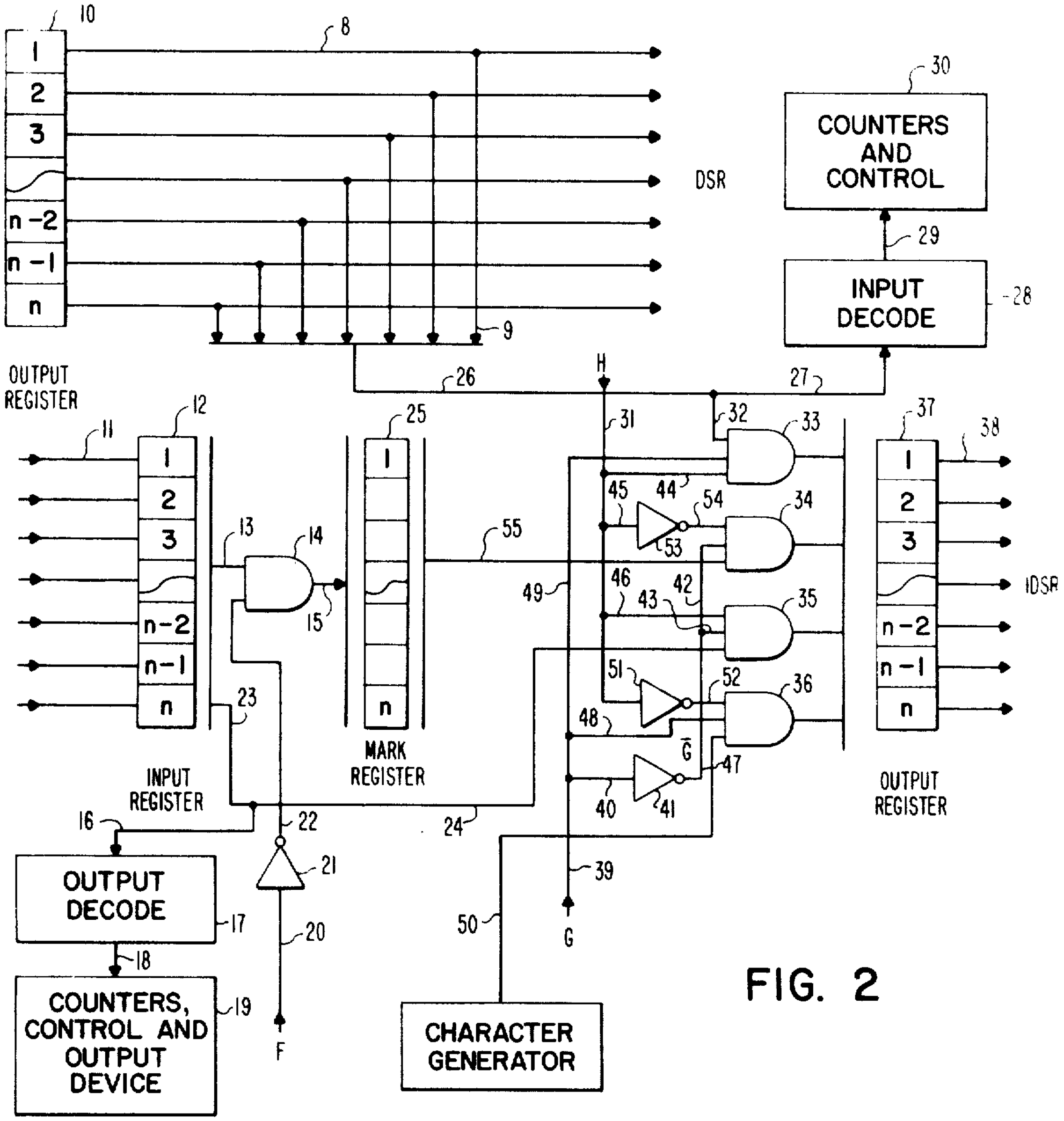
FIG. 2 is a detailed drawing of the preferred embodiment of the IDSR with certain buffers connected between its input and output stages which are controlled by control logic to accomplish alteration of data paths for the timewise shifting of data for inputting, insertion, or deletion of characters, flags, etc.

For more detailed description of the subject intermediate dynamic shift register and control technique, and for an operational description thereof, reference is made to FIG. 2. In FIG. 2 are lines 11 which represent the output lines from the output stage of the IDSR, and lines 38 which are connected to the input stage of the IDSR. Lines 11 from the output stage of the IDSR are applied to the input register 12. The input register 12 is as shown for *n* stages. The output from the input register 12 is as shown applied along line 13 to AND gate 14 which in turn receives the F logical input along line 20 through inverter 21 and along line 22. Thus, application of a positive logical level to line 20 results in AND gate 14 inhibiting passage of data from the input register 12 onto line 15 and into the mark register 25. Application of a negative logical level or $\overline{F}$ to line 20, acting through inverter 21, causes line 22 to apply a positive logical level to AND gate 14 and thus allows the data from the input register 12 to pass into the mark register 25 along line 15. The contents of the input register 12 are also applied along lines 23 and 24 to AND gate 35.

The contents of the input register 12 which pass through AND gate 14 and along line 15 into mark register 25 when a low logical level is applied to line 20 can, on the next bit or shift time, be applied along line 55 to AND gate 34. The outputs from, and other inputs to, AND gates 34 and 35 will be discussed in more detail later in the specification.

The contents of input register 12 which pass along line 23 are also applied along line 16 and decoded by output decode 17 which has its output applied along line 18 to counters, control logic, and output device 19. The control logic has been divided and shown in both blocks 19 and 30 for convenience and simplicity of description. Only one block could have been used showing the control logic controlling the entire IDSR. Decode unit 17 decodes the characters appearing on line 23 and provides decoded information to the control logic. More specifically, as will later become apparent, the characters decoded by decode unit 17 include dummy codes, delete codes, flags, etc. coming out of the output stage of the IDSR.

An H logical signal is applied along line 31 to lines 44, 45, and 46. Line 44 constitutes one input to AND gate 33. The signal applied to line 45 through inverter 53 constitutes the second input to AND gate 34. The signal applied along line 46 constitutes the second input to AND gate 35, and the signal applied along line 31 through inverter 51 is applied along line 52 to AND gate 36. Further, the G logical signal which is applied to line 39 is also applied along lines 40, 48, and 49. The signal applied along lines 39 and 49 makes up the second input to AND gate 33, while the signal applied along lines 39 and 48 makes up the second input to AND gate 36. The G logical signal is also applied along line 40, through inverter 41, and along lines 47, 43, and 42. The signal applied along lines 47 and 43 makes up the third input to AND gate 35, while the signal applied along lines 47 and 42 makes up the third input to AND gate 34. The third input to AND gate 33 is made up from the signals applied from the output register 10 of the DSR along lines 8, 9, 26, and 32. These signals are also applied along line 27 to input decode 28 which decodes the characters appearing on lines 8 of the DSR and provides decoded information to the control logic and counters 30 along line 29. Decode 28 decodes the codes input into the input stage of the IDSR from the DSR. The third input to AND gate 36 is from a character generator along line 50. The character generator is for generating line end (CR) and delete codes and is controlled by the control logic shown in blocks 19 and 30. The control logic shown in blocks 19 and 30 controls the signals applied to the F, G, and H lines for alteration of data paths, and as pointed out also controls the character generator.

The outputs of AND gates 33, 34, 35, and 36 are applied to the output register 37 which is connected to the input lines 38 of the IDSR.

Thus, from the above, it will seen that application of a positive logical level to the F line 20 will result in the contents of the input register 12 being inhibited from passing through AND gate 14, while application of a low logical level or a $\overline{F}$ to line 20 will cause the contents of the input register 12 to be passed through AND gate 14 to the mark register 25. Further, the contents of the mark register 25 always are applied to AND gate 34 and are selectively gated to the output register 37 by application of low logical levels applied to the H line 31 and the G line 39. Thus, unless both the H and G signals are low the data in the mark register 25 will not pass through AND gate 34 to the output register 37.

In addition, as previously described, when the mark register 25 is to be bypassed and data is to be gated from the input register 12 to the output register 37, a positive logical level is applied to the H line and a low logical level is applied to the G line. The contents of the input register 12 applied along lines 23 and 24 are then gated through AND gate 35 to the output register 37. Also, when a line end code or a delete code is to be gated to the output register 37 from the character generator along line 50, a low logical level is applied to the H line and a positive logical level is applied to the G line. A delete or line end cde is then gated through AND gate 36 to output register 37. Further, when the contents of the DSR are to be applied to the output register 37, (the contents of the DSR are to be loaded into the IDSR) positive logical levels are applied to both the H and G lines and the contents of the DSR are gated through AND gate 33 to output register 37.

The IDSR shown in FIG. 2 is structurely similar to the DSR described in detail in the above cross-referenced applications Ser. No.'s 104,888, 158,346, and 158,347. The primary differences relate to the absence of a data or control buss, an additional point of decode, the absence of an insert register, and the inclusion of a character generator.

The DSR represented by block 2 of FIG. 1 and partially represented by output register 10 and lines 8 of FIG. 2 is fully described in the applications referred to in the preceding paragraph.

The counters represented by blocks 19 and 30 could also have been represented in a single block, but have been shown separately for simplicity. The counters represented by these blocks include a pre-flag line end counter, a total line end counter, and a post flag line end counter. The pre-flag line end counter is a two stage resettable up counter structured to count only up to three line endings before the operation flag. The total line end counter is a resettable up/down counter structured to count all line endings detected before the operation flag. The post flag line end counter is a resettable up/down counter structured to count only up to three line endings detected following the operation flag.

The basic timing employed by the IDSR shown in FIG. 2 is the same as that shown and illustrated in the above cross-referenced application Ser. No. 104,888.

Figure 3:
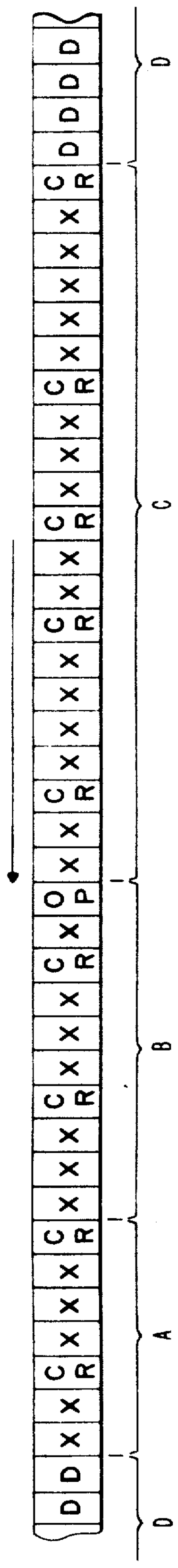
FIG. 3 is a drawing showing one DSR data flow arrangement which is partially transferred to the IDSR and altered for output purposes.

Refer next to FIG. 3 wherein there is shown a DSR data flow broken into defined zones labeled A, B, C, and D. Zone A is that portion of the data more than three pre-flag line endings before the operation flag and includes the third line ending before the operation flag. Zone B is made up of two text lines before the operation flag and includes a portion of a third line which contains the operation flag. Zone C is made up of the post flag text and line endings. Zone D is made up of dummy codes.

For simplicity, dummy codes and delete codes can be taken as synomomous. In the above cross-referenced applications, delete codes and dummy codes are referred to as distinct codes as related to the DSR. Although both are gated from a data or control buss, the term dummy code is meant to include a non-text character initially written into memory to define a data position. After characters are written into memory over dummy codes, the deletion of a character is accomplished by the writeover of that character with a delete code. Therefore, in effect delete codes are dummy codes interspersed among text characters. When the IDSR is considered, delete codes are written over text characters and control codes, but form an extension of the dummy code chain as will become more readily apparent later in the specification. That is, a revision operation per se is not performed relative to the data flow in the IDSR. A delete operation is performed for eliminating excess text at the end, and at the beginning, of the IDSR data flow. Delete codes are not purposely intermingled with text characters in the data flow in the IDSR. This is not to say that delete codes will not exist in the data flow among characters in the IDSR. Delete codes could have been present in the DSR data flow and merely gated to the IDSR along with the characters during the loading of the IDSR.

Figure 4:
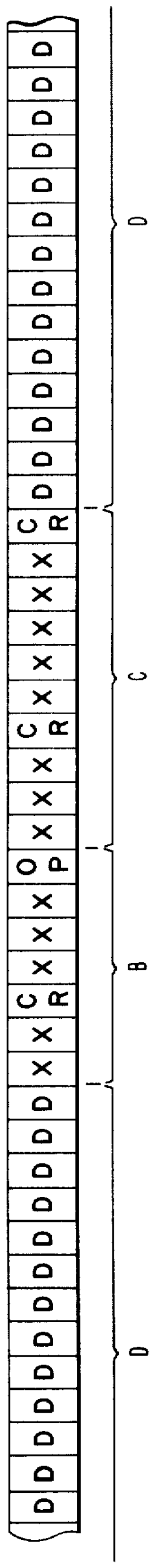
FIG. 4 is a drawing showing another DSR data flow arrangement which is transferred to the IDSR and later altered for output purposes.

In FIG. 4 is shown another DSR data flow wherein zone D is again made up of dummy codes. Zone B is again the pre-flag data, and zone C is again the post flag data.

Figure 5:
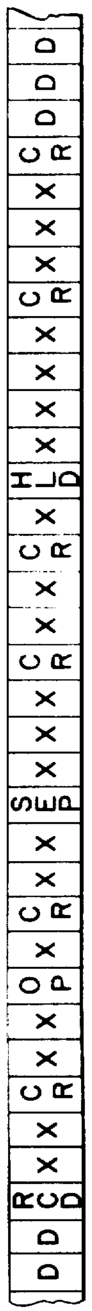
FIG. 5 is a drawing illustrating a DSR memory arrangement of data and control codes defining a normal and alternate section with the operating point positioned in the normal section.

In FIG. 5, there is depicted the data flow in the DSR where sections are illustrated and defined by a separator code with the operation flag in one section and the hold flag in another. When alternate section capabilities are considered, reference is made to the above cross-referenced applications Ser. No.'s 194,418, 214,369, and 214,370, wherein an operational description is set forth in detail.

Reference is now to FIG. 3 in conjunction with FIG. 2. When loading of the IDSR is to begin, negative logical levels are applied to both the H and G lines and a mark code (hereinafter referred to as "mark") held in the mark register 25 is allowed to shift to the output register 37. On the next bit or shift time positive logical levels are applied to the H and G lines and the data appearing on lines 8, 9, 26, and 32 is gated to the output register 37. Assume that the loading of the IDSR begins with the first character in zone A shown in FIG. 3. Each of the characters and line end (CR) codes appearing on lines 8 are decoded by decode 28. For this data flow the pre-flag line end count will be incremented to three when the operation flag is detected. As pointed out above, this is because the pre-flag line end counter is a resettable up counter structured to count only up to three. The total line end count will have been incremented to four when the operation flag is detected. After the operation flag is detected, the post flag line end count will be incremented up to three as line ends are decoded by decode 28. When the post flag line end count equals three, loading of the IDSR is terminated.

When the mark was initally input into the IDSR data flow, a positive logical level was applied to the F line 20 resulting in the absence of an output path from input register 12. In this case, each character and control code appearing on lines 11 is input into input register 12 and written over the character or control code previously input into register 12.

After the post flag line end count has been incremented to three and the loading of the IDSR has terminated, characters and control codes appearing on lines 11 continue to be written over the character or control code held in input register 12. Thereafter, when the mark has looped and is input into input register 12 and decoded by decode 17, the control logic 19 causes a low logical level to be applied to the F line 20 and the mark is gated to the mark register 25 and held. There is no output path from mark register 25 to output register 37. As described above, when the post flag line end count reaches three, the loading of the IDSR from the DSR is terminated. At this time a low logical level is applied to the H line 31 and a positive logical level is applied to the G line 39 and delete codes are gated into the data flow by the character generator.

The above discussion is also based on the assumption that the mark will not have made one complete revolution in the IDSR by the time the post flag line end count reaches three. The aspects of this condition will be brought out later in the specification.

Since the total line end count is equal to 4 and the pre-flag line end count is equal to 3, delete codes continue to be gated into the output register 37. As line end (CR) codes are decoded by decode 17, the total line end count is decremented until it is equal to the pre-flag line end count. When the counts are equal, the next CR code detected is held in the input register and written over with the following character in the data flow. Then on the next shift time, a low logical signal is applied to the G line 39 and a positive logical level is applied to the H line 31. Here, the character following the third CR code before the operation flag shifts to the output register along line 24 and the data flow is now allowed to loop in the IDSR. Delete codes are no longer gated to the output register 37. Also, at this time the data flow in the IDSR is comprised of five lines with the operation flag positioned in the middle line. If desired, the data can be output to a bulk store at this time along lines 16 and 18.

If the data in the IDSR is to be displayed, decoding by decode 17 continues along with a decrementing of the total line end count. When the total line end count has been decremented to zero, the character in the input register 12 will be the first character of the line containing the operation flag. This line (third line) will be displayed first, followed by the fourth, fifth, first and second lines.

The control of the display by format control 5 and frame buffer 6 (FIG. 1) is described in the above cross-referenced application Ser. No. 219,798. As pointed out earlier in the specification, output to either a display or bulk store per se forms no part of the instant application. The present application is directed solely to preparation of data for output purposes.

The handling by the IDSR control logic of other data flows input into the IDSR from the DSR will depend on when loading begins and the amount of data contained in the DSR before and after the operation flag. This will be illustrated in the following examples where (1) the DSR data flow does not contain three line endings before the operation flag, (2) the DSR data flow does not contain three line endings following the operation flag, (3) a separator flag is encountered before the operation flag, (4) a separator flag is encountered following the operation flag, (5) dummy codes are detected before the operation flag, (6) dummy codes are detected following the operation flag, and (7) when IDSR loading begins, less than three line endings are detected before the operation flag.

Refer next to the data flow shown in FIG. 4 and assume the first character in zone B is to follow the mark into the IDSR data flow. This character will enter register 10 of FIG. 2 during the same bit time that the mark is released. As before, low logical levels are applied to both the G and H lines and the mark held in the mark register 25 is gated to the output register 37. On the next bit or shift time, positive logical levels are applied to the G and H lines and the character now in the output register 10 shifts along lines 8, 9, 26, 32, and through AND gate 33 to output register 37. Each of the characters and control codes appearing on lines 8 are decoded by input decode 28 along line 27. For this data flow only one line ending code exists prior to the operation flag and the pre-flag line end count and the total line end count will be incremented to one. Since the pre-flag line end count is not equal to three when the operation flag is detected, all counts are reset to zero and the operation is restarted. This is for purposes of assuring that three line endings before the operation flag did not exist in the DSR data flow. The output of the input register 12 is decoded by output decode 17, and when the mark is found, it is input into the mark register and allowed to shift to output register 37 along with the continued loading of the IDSR from the DSR.

Assume now that the character following the first line ending in zone C follows the mark into the IDSR data flow (output register 37). One line ending code will be detected before the dummy code chain in zone D. When this CR code is detected, the pre-flag and total line end count will be incremented to one. Thereafter, when the dummy codes are detected, the pre-flag line end count will be reset to zero. If the mark is detected (decode 17) during the loading of the dummy code chain into output register 37, it is input to the mark register 25 and held. Then, as before the mark was detected, codes entering the input register are written over the code held in the input register. Eventually the characters and control codes in zone B will again be input into the IDSR output register 37. The detection (by decode 28) of the CR code in zone B will increment the pre-flag and total line end counts to one. The total end count was incremented to one due to detection of the last CR code in zone C, but was later decremented to zero when the CR code was detected by decode 17 in the input register.

After the operation flag is detected, the detection of CR codes will result in the incrementing of the post flag line end count. This count will be two when the dummy code chain is again detected. At this time, loading of the IDSR from the DSR is terminated and a line end code is gated to the output register 37 to bring the post flag line end count up to three. This is for purposes of compensating for insufficient text lines following the operation flag. Also, another CR code is gated into the data flow to bring the number of pre-flag line ends up to two (without incrementing the pre-flag line end count). The post flag line end count is decremented by one. The post flag line end count (two) is now equal to the pre-flag line end count plus one. The reason for obtaining a post flag line end count equal to a pre-flag line end count plus one if to obviate the necessity for gating another CR code into the data flow and later removing it. That is, even though the basic object is to obtain three line endings before and after the operation flag, as with the above example related to FIG. 3, the third line ending before the operation flag is removed before output in any event.

Delete codes now are gated to the output register 37 and written over dummy codes until the first character in zone B is detected. At this time exactly the data to be output is contained in the IDSR. The IDSR memory continues looping and when the CR code in zone B is detected the total line end count is decremented. At this time it will be zero. All counts are then reset to zero and the line containing the operation flag is displayed followed by the fourth, fifth, first and second lines. For the data flow in FIG. 4, the first and fifth lines displayed will be blank, but their position has been accounted for. That is, the third line containing the operation flag will be positioned in the center of the display with the second line above and the fourth line below.

After the data has been displayed, revision operations can be performed in the DSR and the revised material can again be obtained for display purposes.

Next assume the data flow in FIG. 4 and also assume that a separator flag exists in memory between the CR code and operation flag in zone B. As before, if the codes in zone B follow the mark into the IDSR, the operation will be restarted when the operation flag is detected. This is because less than three CR codes were detected before the operation flag. Thereafter, as the operation proceeds, three CR codes will be written into the IDSR following zone C to make up for deficient line ends before and following the operation flag. The CR codes prior to the separator flag are not considered since they relate to another page of job. Also, prior to display the separator flag will be removed from the data flow.

Refer now to the data flow in FIG. 5. The separator flag follows the operation flag in this case. The separator flag and the two following characters will be written over with CR codes to compensate for insufficient line ends (1) following the operation flag and before the separator flag, and (2) preceding the operation flag. Thereafter, the following character, dummy, and/or control codes will be written over with delete codes through the record flag.

In the following description relates to the flow charts shown in FIGS. 6 through 10, it will be apparent that the operations depicted can be performed by a general purpose computer readily programmed by those skilled in the art.

Figure 6:
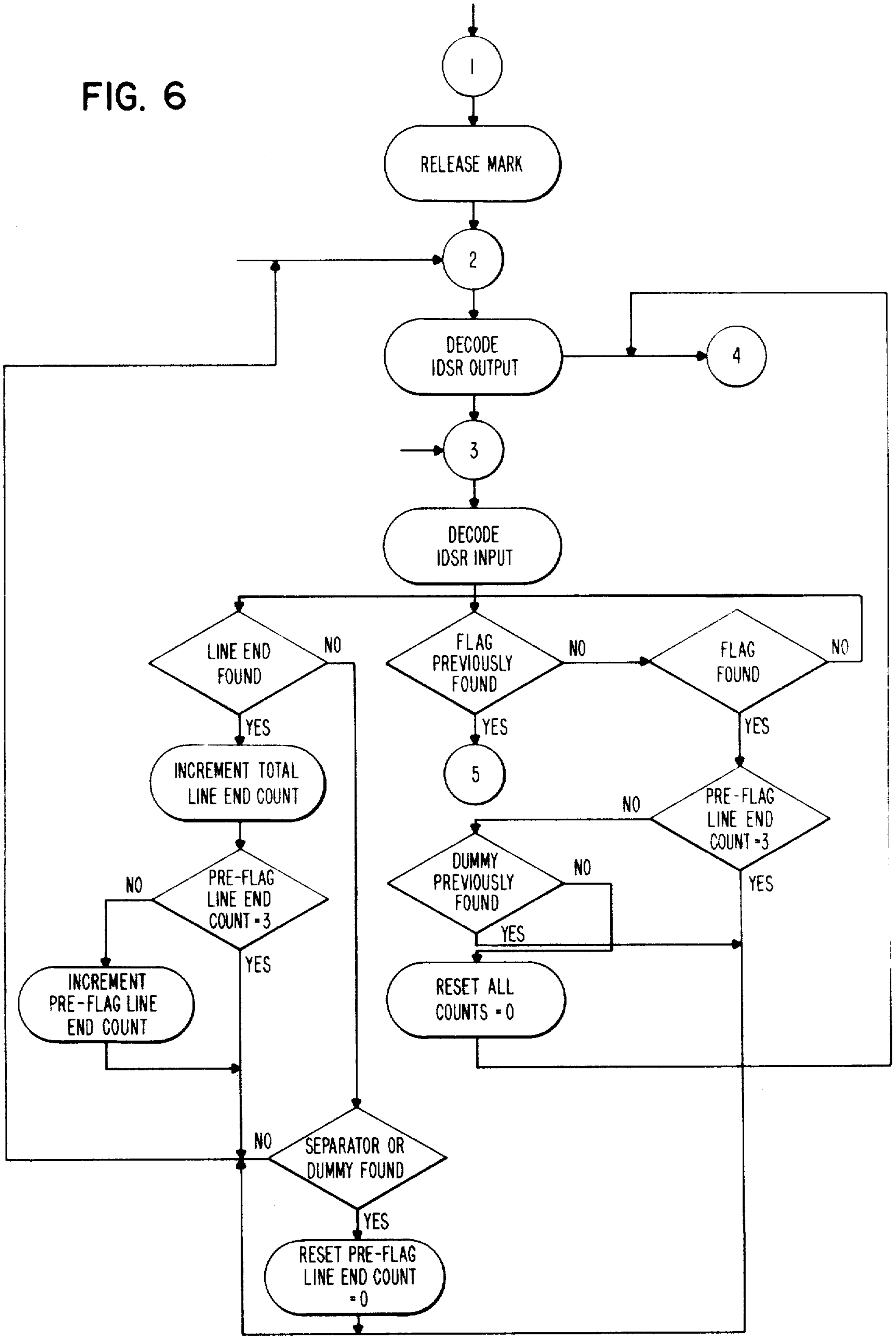
FIG. 6 is a flow chart illustrating the operation performed when the IDSR is to be loaded with a portion of the data contained in the DSR.
Figure 7:
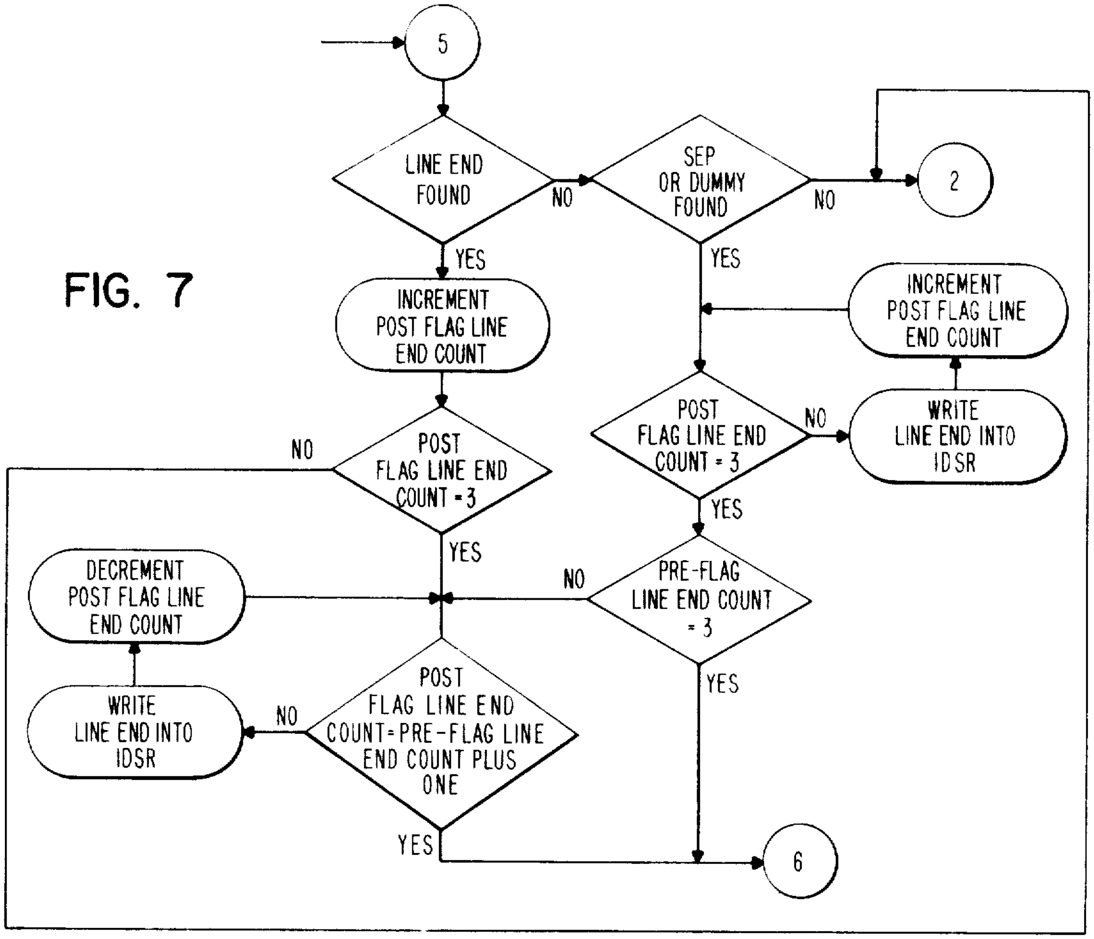
FIG. 7 is a flow chart illustrating the operation performed after the operation flag has been detected in the IDSR data flow.
Figure 8:
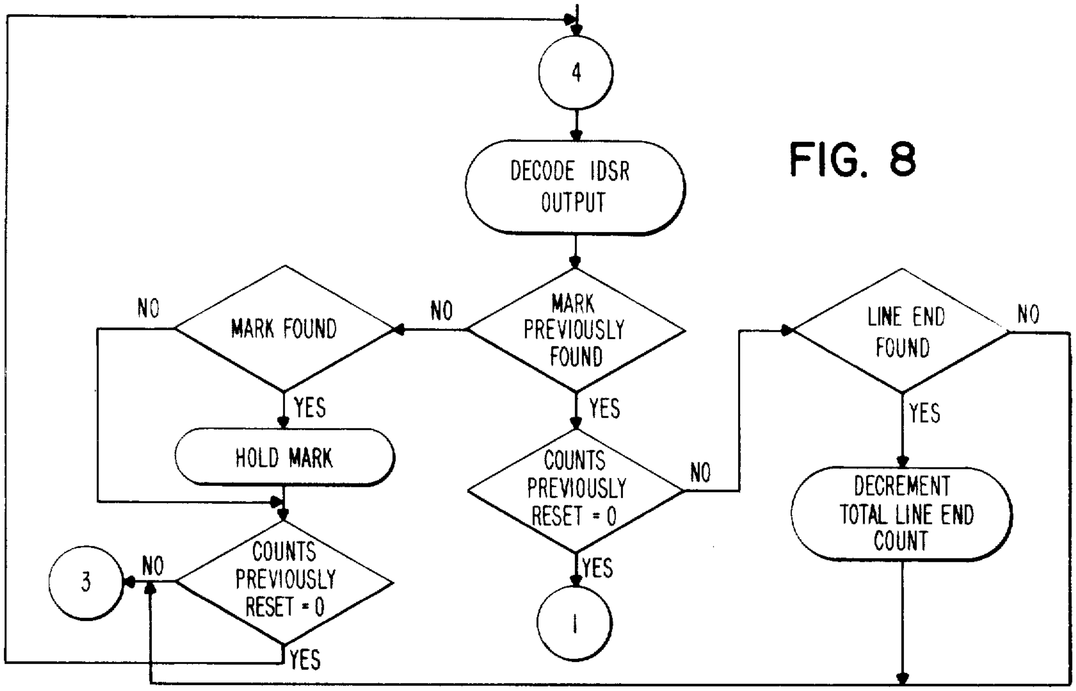
FIG. 8 is a flow chart illustrating the operation with respect to the output of the IDSR during the loading of the IDSR.

Referring first to FIG. 6, there is shown the flow taken by the system when the IDSR is to be loaded with data contained in the DSR. Initially, the data path is altered and the mark is released from the mark register. At this time, the data flow out of the IDSR and the data flow into the IDSR are decoded. During the decode of the input into the IDSR if the operation flag had not been previously found, loading and decoding continue. If a line end code is detected, the total line end counter is incremented as is the pre-flag line end count (up to three). As long as pre-flag line ends are detected, the total line end counter is incremented. When the operation flag is ultimately found and the pre-flag line end count is equal to three, the operational flow is as shown in FIG. 7. Still referring to FIG. 6, if the pre-flag line end counter has not been incremented to three and a dummy or separator code is detected, then the pre-flag line end counter is reset to zero. The operation then continues with line ends being detected and counted after dummy codes or a separator code. If (1) the operation flag has been found, (2) the pre-flag line end count is not equal to three, and (3) a dummy has not been previously found, all counters are reset to zero and the operation is as shown in FIG. 8. This would indicate (1) that insufficient text data codes and line ends prior to the operation flag were input into the IDSR for obtaining the desired three line endings before the operation flag, and (2) that the operation is to be restarted. After the mark has made one revolution and is detected, line end counting resumes with the continued loading of the IDSR.

Figure 9:
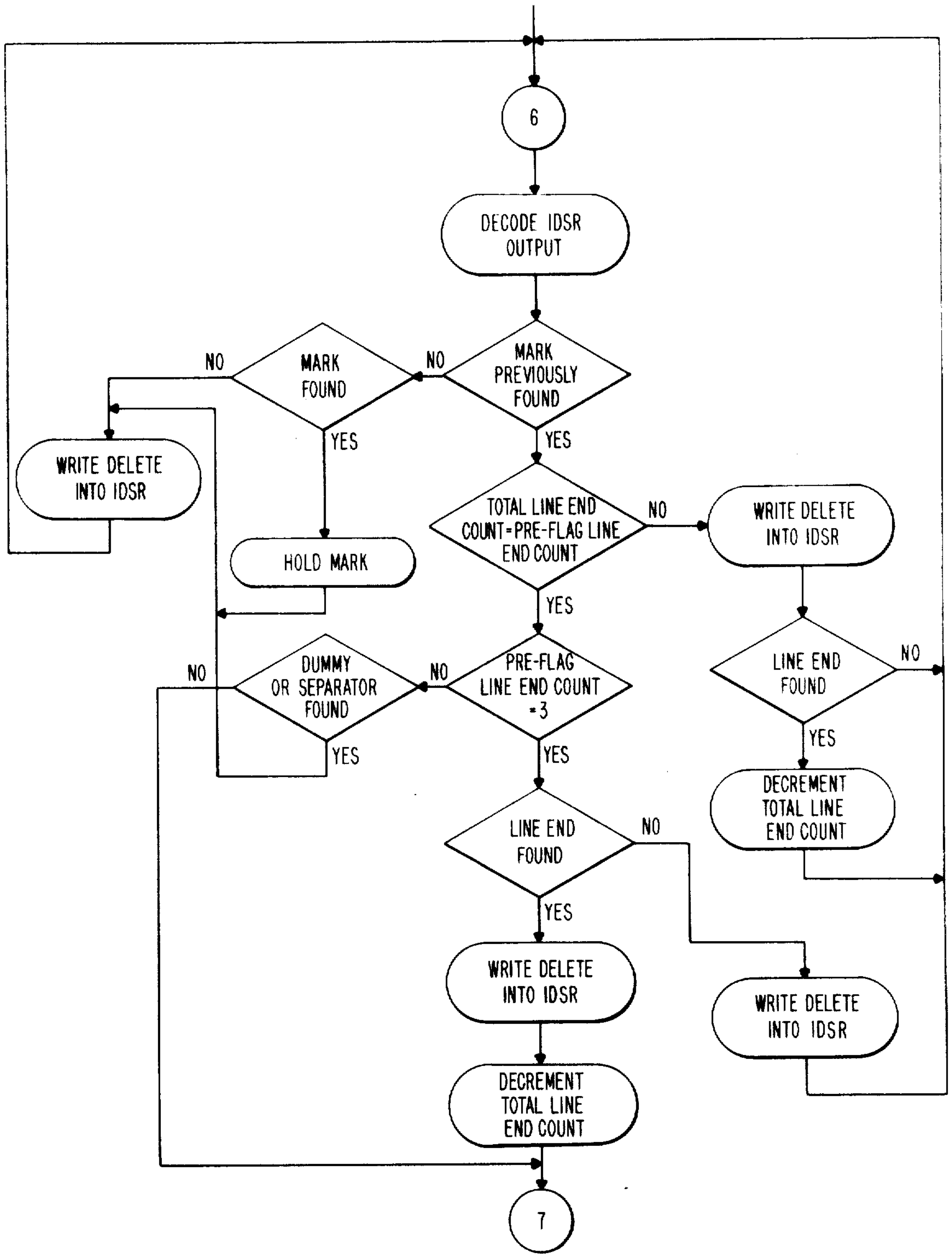
FIG 9 is a flow chart illustrating operations of obtaining only the data to be output or displayed from the IDSR.

Once the flag has been found and the operation at that time involves the continued loading of the IDSR from the DSR, a line end code detected will result in the incrementing of a post flag line end counter. Referring to FIG. 7, when the post flag line end count is equal to three, a determination is made as to whether the post flag line end count is equal to the pre-flag line end count plus one. If not, line end codes are written into the IDSR and the post flag line end counter is decremented until the post flag line end count is equal to the pre-flag line end count plus one. When equal, the flow taken by the system is as shown in FIG. 9. Still referring to FIG. 7, if a line end code is not detected, but a dummy or separator is detected, a decision is made as to whether the post flag line end count is equal to three. If so, another determination is made as to whether the pre-flag line end count is equal to three, and if so the flow is again as shown in FIG. 9. If less than three, a determination is again made as to whether the post flag line end count is equal to the pre-flag line end count plus one. If not, line end codes are written into the IDSR and the post flag line end counter is decremented until the post flag line end count is equal to the pre-flag line end count plus one.

After a dummy or separator code are detected and the post flag line end count is not equal to three, line end codes are written into the IDSR while the post flag line end counter is incremented up to three. Referring again to the beginning of FIG. 7, if neither a line end code, dummy code, or separator flag have been detected, the flow is again as shown in FIG. 6 beginning with the decoding of the IDSR input and output.

The flow taken by the system as a result of the decoding of the IDSR output is as shown in FIG. 8. If the mark has not been previously found, but is now detected, the data path is altered and the mark is held. If all counters have not previously been reset to zero, then the flow is as shown in FIG. 6 beginning with the decoding of the input to the IDSR. If all counters have previously been reset to zero, then decoding of the IDSR continues until the mark is found. After the mark has been found (previously found), a determination is again made as to whether the counters have previously been reset to zero. If so, the operation is restarted and the flow is as shown at the beginning of FIG. 6. If not, a line end code is sought, and when found, the total line end counter is decremented. The flow will now be as shown in FIG. 6 with the continued decoding of the IDSR input. If a line end code is not detected, the total line end counter is not decremented and the flow is as shown in FIG. 6 with the continued decoding of the IDSR input.

Figure 10:
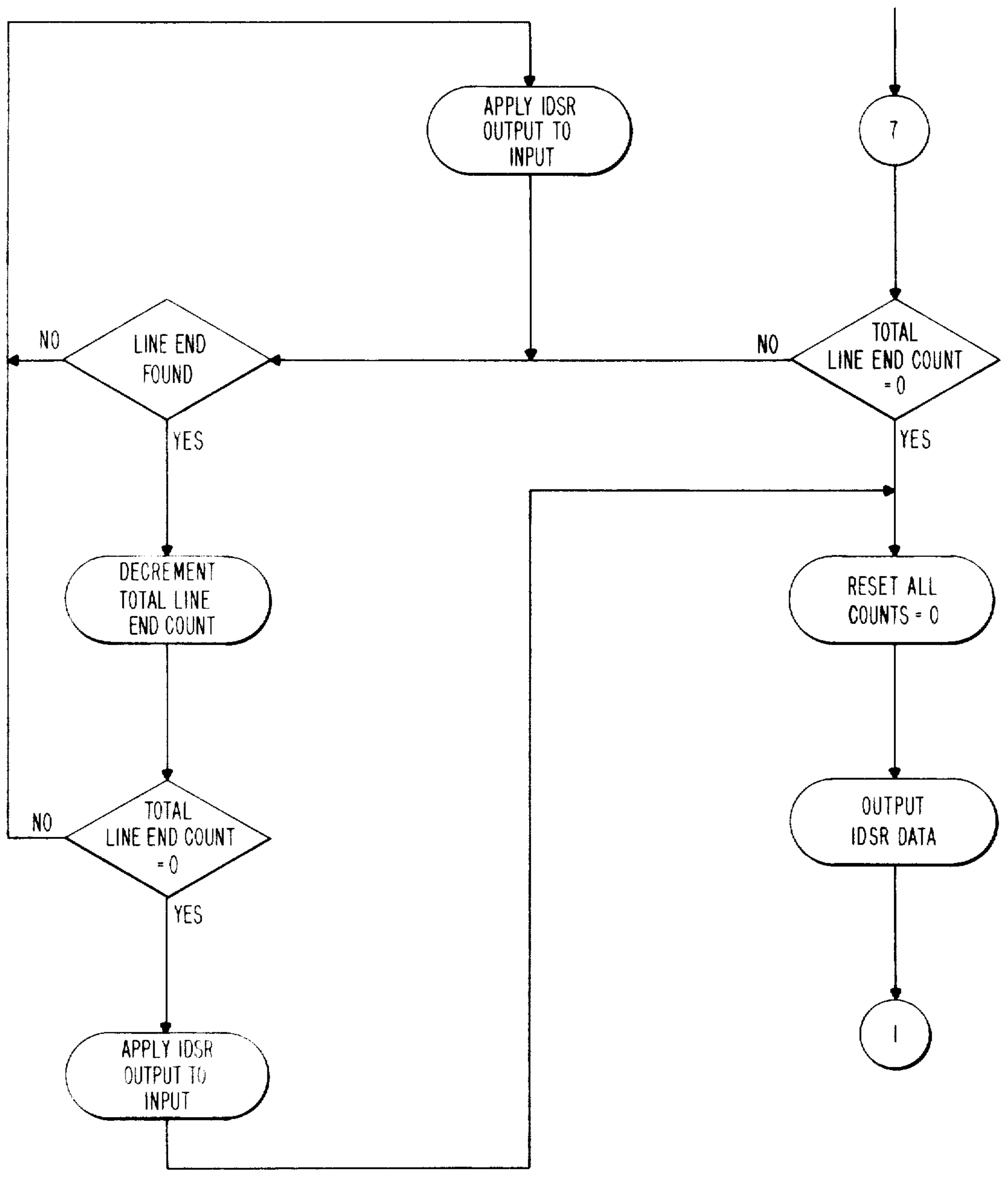
FIG. 10 is a flow chart illustrating the obtaining of the line containing the operation flag for output purposes.

Referring to FIG. 9, there is shown the operations of obtaining output data determined by the results of the decode of the IDSR output. If the mark has not previously been found, but is now detected, the data path is altered and the mark is held in the mark register. Delete codes are now written into the IDSR. When the output of the decision block "mark previously found" is yes, a determination is made as to whether the total line end count is equal to the pre-flag line end count. If not, delete codes are written into the IDSR until the counts are equal. Line end codes then detected result in the decrementing of the total line end counter. When the total line end count is equal to the pre-flag line end count, a determination is made as to whether the pre-flag line end count is equal to three. If not, and a dummy or separator code is detected, delete codes are written into the IDSR. If neither a dummy or separator code are found, the flow is as shown in FIG. 10. When the pre-flag line end count is equal to three, a line end code is sought. If found, a delete code is written into IDSR with the corresponding decrementing of the total line end counter. At this time, exactly the data to be displayed is contained in the IDSR. The flow can now be as shown in FIG. 10. If a line end code is not detected, delete codes are written into the IDSR until a line end code is detected.

Referring to FIG. 10, there is shown the flow for obtaining the line containing the operation flag for output purposes. If the total line end count is now equal to zero, all counters are reset and the data contained in the IDSR is output to an output device such as a display. If the total line end count is not zero, a line end code is sought. If not found, the data path is altered and no more data is output or input into the IDSR. The data flow in the IDSR loops and when a line code is detected, the total line end counter is decremented and a determination is again made as to whether the total line end count is equal to zero. If not, another line end code is sought. If yes, all counters are reset to zero and the line containing the operation flag has been detected. Following the output of data in the IDSR, the IDSR is now ready for reloading with new data for output purposes, and the flow is as shown in FIG. 6.

In summary, through the use of a system having an I/O typewriter, a DSR, an IDSR, and a display device, a number of lines about a point of operation in the DSR can be obtained and displayed for checking and revision purposes. Upon viewing the displayed material, it can be checked for any necessary revisions to be accomplished in the DSR. The DSR is initially loaded with data codes, and control codes such as dummy codes, carrier return (CR) codes, record, operation, hold, and separator flags making up and defining lines of text, operating points, and sections. With the DSR loaded, the loading of the IDSR can begin at any point in the DSR memory. A mark code is first input into the IDSR data flow and followed by codes from the DSR. The mark code is for distinguishing between old and new codes in the IDSR. During the loading of the IDSR a total line end counter and a pre-flag line end counter are incremented as line ends are detected going into the IDSR. The pre-flag line end counter can only be incremented up to three which is the necessary number of lines to be obtained prior to the operaion flag. The total line end count is the total count of line ends up to the detection of the operation flag. If the pre-flag line end counter fails to be incremented to three before the operation flag is detected, then insufficient text has been acquired prior to the operation flag for display purposes. Also, if the pre-flag line end codes gated into the IDSR were preceded by a dummy or separator code, then the operation flag was within three lines of the beginning of the page. In this case, line end codes are later written into the IDSR to bring the pre-flag line end count up to three. Upon detecting the operation flag, both the pre-flag line end counter and the total line end counter cease incrementing.

After the operation flag has been detected, loading of the IDSR continues until the post flag line end counter either reaches three, or a dummy or separator code is detected indicating that the operation flag was near the end of the page. In either event, loading of the IDSR is terminated since sufficient text has been loaded into the IDSR for purposes of display. At this time, any line end deficiencies are made up by writing line end codes into the IDSR.

Once the mark code has made one revolution in the IDSR, it is held and all codes detected at the output of the IDSR are new. The line end codes which are detected thereafter at the IDSR output are used to decrement the total line end counter. Therefore, the total line end count will be equal to the number of line ends in the IDSR preceding the operation flag.

The loading of the IDSR terminates with the detection of a dummy or separator code or when the post flag line end count reaches three as pointed out above. There may have been considerable number of pre-flag line endings prior to the operation flag which must be removed. This is accomplished by writing over codes with delete codes while continuing to decrement the total line end counter until it is equal to the pre-flag line end count. At this time, the text remaining in the IDSR is exactly the text to be displayed.

While the invention has been particularly shown and described with reference to a particular embodiment, it will be understood by those skilled in the art that various changes in form and detail may be made without departing from the spirit and scope of the invention.

What is claimed is:

1. A system for obtaining a number of particular text lines about, and including, a line containing an operating point control code for output purposes, said system comprising:

a. first means for storing text lines made up of data and control codes;

b. a second means for accepting said data and control codes from said means and holding at least a portion of said data and control codes;

c. means for selectively transferring said data and control codes from said first means to said second means;

d. means for determining from all of said data and control codes held in said second means, said particular text lines held in said second means to be output; and e. means for removing data and control codes from said second means in excess of said particular text lines to be output.

2. A system according to claim 1 further including means for inputting line end control codes into said second means for compensating for an insufficient number of text lines.

3. A system according to claim 2 further including means for inputting a mark control code into said second means for distinguishing between old and new data and control codes in said second means.

4. A system according to claim 3 further including means for determining when said selective transfer is to be terminated.

5. A system according to claim 4 further including means for detecting said data and control codes input into an input stage of said second means.

6. A system according to claim 5 further including means for detecting said data and control codes output from an output stage of said second means.

7. A system according to claim 6 further including means for counting the total number of said text lines transferred into said input stage of said second means before said operating point control code is detected.

8. A system according to claim 7 further including means for counting, up to a determined number, the number of said text lines transferred into said input stage of said second means before said operating point control code is detected.

9. A system according to claim 8 further including means for counting, up to a determined number, the number of said text lines transferred into said input stage of said second means following the detecting of said operating point control code.

10. A system according to claim 9 further including means for decrementing the count of said total number of said text lines when text lines are detected at said output stage of said second means.

11. A system according to claim 10 further including means for inputting delete codes into said second means following said termination of said transfer until said first line to be output is detected.

* * * * *